Patented Oct. 10, 1950

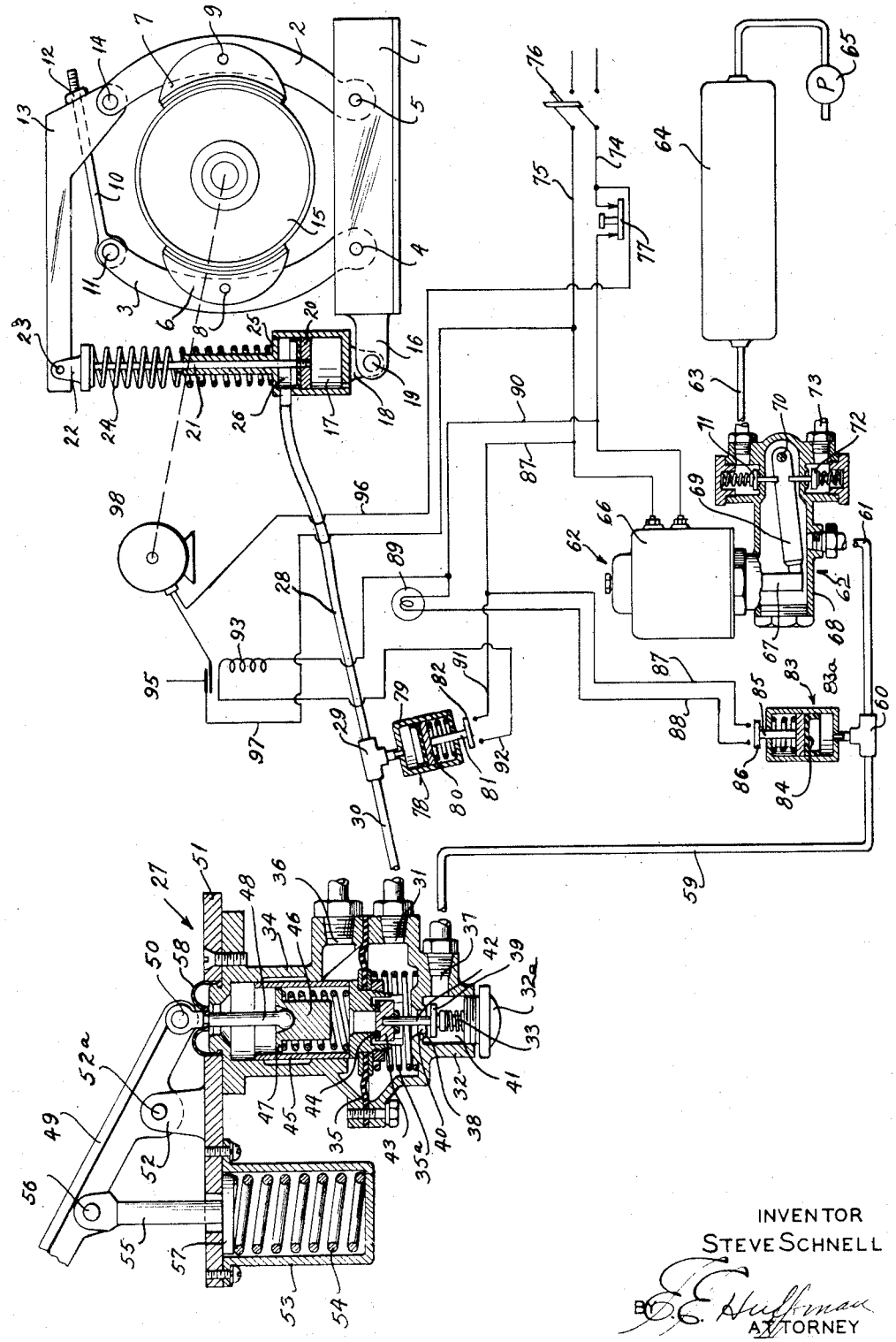

2,525,461

UNITED STATES PATENT OFFICE 2,525,461

AIR RELEASED SPRING SET BRAKE CONTROL

Steve Schnell, Kirkwood, Mo., assignor to Wagner Electric Corporation, St. Louis, Mo., a corporation of Delaware Application February 8, 1946, Serial No. 646,296

4 Claims. (Cl. 318—372)

This invention relates to industrial brakes and in its more specific aspects discloses an improved control therefor.

One of the objects of the invention is to provide a control for an industrial brake in which a control valve actuator is equipped with mechanism to provide increasing resistance to brake pedal travel as pressure is released from a brake motor to simulate the action ordinarily felt when operating truck and tractor brake systems.

Another object of the invention is to provide a spring-applied brake with a pressure fluid motor operated brake release mechanism and in which a metering valve is employed to release pressure fluid from the pressure fluid operated motor to thereby enable the spring to gradually apply the brake.

Still another object of the invention is to provide an industrial brake having a pressure fluid motor to disengage the same interlocked with the electrical system operating the device with which the brake is associated so that the brake will be spring set when the electrical system is de-energized.

A further object of the invention is to provide an application valve for a brake system in which the resistance to movement of the brake pedal is increased as pressure fluid is released from the brake cylinder to thereby apply said brake and in which the resistance increases in proportion to the release of pressure fluid from the brake motor and also in which system means is provided to prevent the release of the brake in the event of insufficient pressure fluid together with suitable signals to inform the operator of pressure fluid conditions.

Other and further objects of the invention will occur to those skilled in the art to which this application pertains as the description proceeds, which, taken in connection with the accompanying drawings, sets forth a preferred embodiment of the invention but such disclosure is not to be construed as a limitation of the invention which is limited only by the appended claims, and any and all modifications, alterations and variations of structure coming within the spirit and scope thereof are deemed to be included herein.

It is desirable in the industrial brake art that some provision be made to closely regulate the degree of braking of spring-applied brakes to permit a more gradual braking of the hoists or other devices controlled by the brake. The instant invention seeks to provide a valve operating device in which means have been incorporated to provide the operator with a mechanism that will resist the application of force to a control valve to release pressure fluid from the brake motor so that he will thereby be apprised of the braked condition of the mechanism to which the brake is applied, as well as inform him by visual or other suitable signals of other operating conditions in the brake control device.

The single figure of the drawing is a diagrammatic view of structure embodying the invention.

The above objects and advantages are achieved in the mechanism set forth in the drawing in which numeral 1 designates a conventional base of an industrial brake having arms 2 and 3 pivoted thereto on pins 4 and 5. Suitable brake shoes or lining holding elements 6 and 7 are pivoted to arms 2 and 3 on pins 8 and 9, respectively. A rod or eye-bolt 10 is pivoted to the upper end of arm 3 by means of pin 11, and nut 12 is threaded to the opposite end of eye-bolt 10 which extends through a suitable slot or aperture formed in brake actuating arm 13 which is pivoted to arm 2 by means of pin 14. When arm 13 is rotated about pin 14, the brake lining holding elements 6 and 7 and the arms with which they are associated are moved toward or away from the brake drum 15 in order to control the rotative motion of the drum.

A bracket 16 is secured to base 1 and has a cylinder 17 provided with a stem 18 pivoted thereto by means of a pin 19 to permit rotational motion between cylinder 17 and bracket 16. Disposed within cylinder 17 is a piston 20 to which piston rod 21 is secured which is suitably connected to a fixture 22 pivoted by means of a pin 23 to the brake actuating lever 13 of the brake assembly. A spring 24 is interposed between fixture 22 and a closure 25 for the cylinder, said closure having a sleeve extending upwardly to serve as a packing retainer and guide or bearing for piston rod 21. Spring 24 normally urges brake rod 13 upwardly to apply brake shoes 6 and 7 to drum 15 and when pressure fluid is admitted to chamber 26, the spring is compressed to thereby disengage the brake shoes from brake drum 15.

It is desired that a control be provided for the brake having means associated therewith to enable the operator to be aware of a "brake feel" to give him some indication of the actual braking condition of the brake assembly. The removal of pressure fluid from cylinder chamber 26 is regulated by a valve 27 whose construction is similar to that shown in United States Patent No. 2,259,809, issued October 21, 1941, and reference is made thereto for a more detailed explanation of the operation of said valve. A suitable conduit 28, preferably flexible in character, is connected to cylinder chamber 26 and leads to a fixture 29 associated with a control switch whose function will be set forth later. Another conduit 30 is connected to fixture 29 and leads to the outlet port 31 of valve 27. The outlet port is arranged in a suitable housing 32 connected by a suitable securing means to the main body of the housing 34 of valve 27 and a diaphragm 35 is connected between the two housings. A spring 35a is arranged below diaphragm 35 to assist in urging it upwardly. Housing 34 is provided with a port 36 which functions as an exhaust port for valve 27. Housing 32 has an inlet port 37 formed therein and a valve seat 38 is formed in housing 32 controlled by a valve 39 having a fluid passage or port 40 therethrough for the passage of pressure fluid admitted into the chamber 41 to conduit 30 from the source of pressure fluid supply. Valve 39 is secured to a valve stem 42 which has an exhaust valve 43 arranged on the other end thereof. Valve stem 42 is slidably received in closure 32a and a spring 33 surrounding stem 42 urges valve 39 into engagement with seat 38. Valve 43 is engageable with a seat 44 secured to element 45 arranged in housing 34 and diaphragm 35 is secured to element 45. Disposed within valve seat element 45 is a movable plug 46 having a spring 47 interposed between said plug and element 45. An actuator rod 48 is extended through an opening in the upper end of housing 34 which is pivotally connected to an actuating lever 49 by means of a pin 50. A plate 51 is appropriately secured to housing 34 and has a bracket 52 thereon with which a pin 52a is associated and on which lever 49 is pivotally mounted. Secured to the lower side of plate 51 is a cup 53 and a spring 54 is disposed within said cup. A plunger rod 55 is pivotally associated with lever 49 by means of a pin 56 and at the opposite end of the plunger rod is a plunger 57 which is received within cup 53 and is engaged by spring 54, said spring normally urging plunger 57 to the position indicated in the drawing. Lever 49 is manually-operated, preferably by foot operation, in order that the vehicle or crane operator will be working under a condition similar to that which exists in motor vehicle operation. To prevent the ingress of foreign matter into valve housing 34, a suitable boot 58 is provided as shown.

The inlet port 37 has a conduit 59 connected thereto which leads to a fixture 60 with which a switch is associated, to be subsequently described, and a conduit 61 leads from fixture 60 to a control valve 62. A conduit 63 is connected between control valve 62 and a pressure fluid reserve tank 64 with which a suitable pump 65 is appropriately connected.

The valve 62 is solenoid-operated and has a solenoid 66 provided with a plunger 67. The solenoid 66 is suitably secured to the valve housing 68 and within said valve housing there is a lever 69 suitably pivoted therein on a pin 70. Disposed on opposite sides of housing 68 are two spring-pressed valves 71 and 72 and operatively connected with lever 69. These valves are so associated that when valve 71 is open, valve 72 will be closed and vice versa. Valve 71 has the pressure fluid supply conduit 63 connected thereto and an exhaust conduit 73 is associated with valve 72.

The solenoid 66 is supplied from power lines 74 and 75 in which a switch 76 is connected. Plunger 67 is returned to the position shown by gravity or a spring (not shown) usually associated with such devices. A normally closed pushbutton switch 77 is connected in one of the lines in the manner illustrated.

Means have been provided to control the operation of the motor which drives the drum 15 so that when there is no pressure fluid in conduits 28 and 30, the circuit for said motor will be interrupted. This comprises an air pressure switch 78 associated with fixture 29 and comprising a cylinder 79 having a plunger 80 therein having a rod 81 associated therewith, and arranged exteriorly of cylinder 79 on rod 81 is a movable switch contact bridging member 82.

A signaling device to indicate the presence of sufficient pressure in the pressure fluid in conduits 59 and 61 is provided on fixture 60 consisting of a pressure fluid switch 83 comprising a cylinder 83a associated with fixture 60 having a plunger 84 therein with which plunger rod 85 is associated and having a movable switch contact bridging member 86 connected thereto exteriorly of cylinder 83a.

The control circuit for the signaling device originates with conductor 87 connected to the power line 75 and leads to one of the fixed contacts of pressure fluid switch 83 and a conductor 88 is connected to the other fixed contact of pressure fluid switch 83 and to an indicator lamp 89. Conductor 90 is connected between lamp 89 and the power line 74.

The motor control circuit originates in a conductor 91 connected to conductor 87 leading from power line 75 and is connected to one of the fixed contacts of pressure fluid switch 78; conductor 92 is connected from the other fixed contact of switch 78 to a coil 93; and a conductor 94 is connected between coil 93 and conductor 90. Conductors 91 and 94 are connected to conductors 87 and 90, respectively, which are connected to power lines 74 and 75. The coil 93 controls a switch 95 in the motor pilot circuit of which conductors 96 and 97 are elements and the open or closed condition of switch 95 will determine whether or not the motor 98 mechanically connected to drums 15 and electrically connected to the pilot circuit will be in condition for operation to rotate drum 15.

The operation of the brake mechanism is dependent upon the manual actuation of valve 43 in valve 27 to allow pressure fluid to escape from cylinder 17 in measured amounts to thereby permit spring 24 to increasingly apply the brake shoes 6 and 7 to brake drum 15. The spring 24 will also apply the brake in the event the pressure in conduits 28 and 30 falls below a predetermined value, thereby opening switch 78 and de-energizing coil 93 and opening switch 95 thereby opening the motor pilot circuit. The spring 24 will also apply the brake in the event the circuit to solenoid 66 is interrupted by opening switches 76 or 77.

Assuming that the pressure fluid system for the brake is empty, closure of switch 76 will energize solenoid 66 which will actuate lever 69, thereby opening inlet valve 71 and closing exhaust valve 72 to permit pressure fluid from reserve tank 64 to flow through conduits 59 and 61 to the inlet port 37 of valve 27. Valve 39 will be open because spring 54 will have depressed diaphragm 35 and spring 35a through plunger 46, thereby closing exhaust valve 43 to prevent the escape of pressure fluid from port 36. The strength of springs 54 and 47 is so proportioned that the aforesaid conditions will result. Pressure fluid will, therefore, flow through port 40, out through port 31, into conduits 30 and 28 to chamber 26 of cylinder 17. The springs 54 and 47 are tensioned to maintain a predetermined pressure, for example, forty pounds, in chamber 26 to keep spring 24 compressed whereupon diaphragm 35 will have moved upwardly to compress spring 47 to close valve 39 while keeping valve 43 closed. This action will take place regardless of any higher pressure of pressure fluid which may be present in the supply tank 64. Assuming that the brake drum and the mechanism connected thereto are in operation and it is desired to apply the brake to the drum, pedal or lever 49 will be actuated, thereby compressing spring 54, lifting plunger 46, and relieving the tension on spring 47. Assuming that it is desired to relieve twenty pounds of pressure, spring 54 will be compressed one-half, thereby producing or simulating a "brake feel" and when the requisite pressure has been relieved from chamber 26 past the port controlled by the exhaust valve 43 to exhaust port 36, said exhaust valve will reclose until such time as the pedal or lever 49 is further depressed to further compress spring 54. Assuming that all of the pressure fluid is to be relieved from chamber 26, the pedal or lever 49 and spring 54 will be pressed down to its maximum extent. It is thus seen that spring 54 provides an indication or "feel" of the degree of braking effected.

The opening of the circuit to solenoid 66 will cause plunger 67 to assume the position shown in the drawing in which valve 71 is closed, thereby shutting off supply tank 64 and opening valve 72. Under this condition pressure fluid will be exhausted from chamber 26 through conduits 28 and 30 and out through ports 40 and 37, conduits 59 and 61, exhaust valve 72, and conduit 73.

In the event the pressure of the fluid in supply tank 64 is insufficient and solenoid 66 has been energized, the pressure condition will be manifested in indicator lamp 89 because the plunger in pressure fluid switch 83 will not cause bridging element 86 to engage the fixed contacts thereon and in this event it will not be possible to release the brake shoes from brake drum 15.

In the event there is insufficient pressure in the pressure fluid in conduits 28 and 30, pressure fluid switch 78 will not close. This condition will keep the circuit to coil 93 open and prevent the closure of the motor control circuit.

Is is evident from the foregoing that the operating conditions are the reverse of those existing in other systems. Normally the operator opens a valve to admit pressure fluid to a brake operating motor with increasing pressure in the brake motor providing the increasing resistance to pedal depression and producing the "feel" but in the instant device pressure fluid is released from a brake operating motor to apply the brake and while releasing pressure fluid, the instant device provides increased resistance to pedal depression. It is also evident that in the event of failure of the pressure fluid supply, the brake will be applied.

Having fully described my invention, that which I claim as novel and desire to protect by Letters Patent of the United States is:

1. A brake mechanism comprising a rotatable member; an electric motor for driving said rotatable member; a pair of brake shoes engageable with said rotatable member; a spring for normally engaging said shoes with said rotatable member; a pressure fluid motor for disengaging said shoes from said member; a valve for controlling the flow of pressure fluid to said pressure fluid motor; a source of pressure fluid; a second valve for controlling the flow of pressure fluid from said source to said first mentioned valve; a solenoid for operating said second valve; a circuit for the electric motor; means in said circuit responsive to the pressure fluid supplied to said pressure fluid motor for controlling said circuit; a circuit for said solenoid; and a switch for controlling the opening and closing of both circuits so that said pressure fluid motor may be actuated before said motor circuit is energized.

2. A brake mechanism comprising a rotatable member; an electric motor for driving said rotatable member; a pair of brake shoes engageable with said rotatable member; a spring for normally engaging said shoes with said rotatable member; a pressure fluid motor for disengaging said shoes from said member; a valve for controlling the flow of pressure fluid to said pressure fluid motor; a source of pressure fluid; a second valve for controlling the flow of pressure fluid from said source to said valve; a solenoid for operating said second mentioned valve; a circuit for the electric motor; means in said circuit responsive to the pressure fluid supplied to said pressure fluid motor for controlling said circuit; a circuit for said solenoid; a switch for controlling the opening and closing of both circuits so that said pressure fluid motor may be actuated before said motor circuit is energized; a signal means; a circuit therefor; and a pressure fluid operated switch responsive to pressure fluid derived from said source for signaling pressure conditions in the pressure fluid supplied to the pressure fluid motor.

3. A brake mechanism comprising a rotatable member; an electric motor for driving said rotatable member; a pair of brake shoes engageable with said member; a spring for applying said shoes to said member; a pressure fluid motor for releasing said brake shoes from said member; a source of pressure fluid; a valve for controlling the application of pressure fluid to said pressure fluid motor; a lever for operating said valve means; a spring for resisting the movement of said lever, said lever when in one position permitting pressure fluid to pass said valve means and be introduced and held in said pressure fluid motor for disengaging said brake shoes from said member and when in another position, compressing said spring, thereby permitting pressure fluid to be exhausted from said pressure fluid motor, and enabling said spring to apply said brake shoes to said member; a solenoid-operated valve for controlling the flow of pressure fluid from said supply to said valve means; means for informing the operator of the pressure condition in said supply; a circuit for the electric motor; and means for closing said circuit operated by pressure fluid passing said lever operated valve means to thereby enable said electric motor to operate the rotatable member.

4. A brake mechanism comprising a rotatable member; an electric motor for driving said rotatable member; a pair of brake shoes engageable with said rotatable member; a spring for normally applying said brake shoes to said rotatable member; a fluid motor for compressing said spring to disengage said brake from said rotatable member; a mechanism including means for admitting pressure fluid to said fluid motor to thereby compress said spring and having other means for regulating the flow of pressure fluid from said motor to permit said spring to apply said brake; means for actuating said mechanism constructed and arranged to enable the operator to "feel" the degree of braking; a source of pressure fluid; a valve for controlling the application of pressure fluid to said mechanism; a solenoid for operating said valve; a circuit for the electric motor; a pressure fluid operated switch for controlling said circuit operable by pressure fluid supplied to said motor; a circuit for said solenoid; a switch for controlling said last mentioned circuit and the application of pressure fluid to said mechanism for the operation of said fluid motor; and means responsive to pressure fluid in said source for informing the operator of the pressure condition of pressure fluid supplied to said valve.

STEVE SCHNELL.

REFERENCES CITED

The following references are of record in the file of this patent:

UNITED STATES PATENTS

| Number | Name | Date |
| --- | --- | --- |
| 1,659,203 | Jackson | Feb. 14, 1928 |
| 1,794,461 | Jackson | Mar. 3, 1931 |
| 2,065,820 | Mellon | Dec. 29, 1936 |
| 2,215,356 | Hewitt | Sept. 17, 1940 |
| 2,270,431 | Freeman | Jan. 30, 1942 |
| 2,288,912 | Mears | July 17, 1942 |
| 2,336,887 | Piron | Dec. 14, 1943 |